US011908428B2

(12) United States Patent
Kim et al.

(10) Patent No.: US 11,908,428 B2
(45) Date of Patent: Feb. 20, 2024

(54) DISPLAY APPARATUS

(71) Applicant: SAMSUNG DISPLAY CO., LTD., Yongin-si (KR)

(72) Inventors: Jung-Won Kim, Seoul (KR); Dongwon Park, Asan-si (KR); Jaesung Bae, Suwon-si (KR); Nam-Gon Choi, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 17/820,239

(22) Filed: Aug. 16, 2022

(65) Prior Publication Data

US 2022/0398989 A1 Dec. 15, 2022

Related U.S. Application Data

(62) Division of application No. 16/664,250, filed on Oct. 25, 2019, now Pat. No. 11,436,989, which is a (Continued)

(30) Foreign Application Priority Data

Feb. 25, 2016 (KR) ........................ 10-2016-0022713

(51) Int. Cl.
*G09G 3/36* (2006.01)

(52) U.S. Cl.
CPC ......... *G09G 3/3614* (2013.01); *G09G 3/3607* (2013.01); *G09G 2300/0426* (2013.01);
(Continued)

(58) Field of Classification Search
CPC ............... G09G 3/3614; G09G 3/3607; G09G 2300/0426; G09G 2320/0233; G09G 2320/0247
See application file for complete search history.

(56) References Cited

U.S. PATENT DOCUMENTS 4,366,500 A 12/1982 Kurtz et al.
6,323,871 B1 11/2001 Fujiyoshi et al.
(Continued)

FOREIGN PATENT DOCUMENTS

KR 10-2006-0070341 6/2006
KR 10-2010-0061301 6/2010
(Continued)

*Primary Examiner* — Ariel A Balaoing
(74) *Attorney, Agent, or Firm* — F. CHAU & ASSOCIATES, LLC

(57) ABSTRACT

A display apparatus includes a plurality of pixels arranged in rows and columns, each pixel column extends in a first direction and each pixel row extends in a second direction crossing the first direction, a first data line extending in the first direction and configured to transfer a data voltage to pixels included in at least two pixel columns, and for each pixel row, a first gate line extending in the second direction and disposed at a first side of the pixel row, and a second gate line extending in the second direction and disposed at a second side of the pixel row, the first and second sides of the pixel row are opposite to each other. In a pair of adjacent pixel columns, pixels, which are connected to the first gate line of their respective pixel row, are arranged in a zigzag arrangement in the first direction.

5 Claims, 7 Drawing Sheets

Related U.S. Application Data division of application No. 15/440,425, filed on Feb. 23, 2017, now Pat. No. 10,482,831.

(52) U.S. Cl.
CPC ............... *G09G 2320/0233* (2013.01); *G09G 2320/0247* (2013.01)

(56) References Cited

U.S. PATENT DOCUMENTS

| | | | | |
|---|---|---|---|---|
| 8,179,350 | B2 * | 5/2012 | Park | G09G 3/3648 345/87 |
| 8,451,262 | B2 | 5/2013 | Lee et al. | |
| 8,681,083 | B2 | 3/2014 | Kang et al. | |
| 8,773,419 | B2 * | 7/2014 | Nam | G09G 3/3648 345/212 |
| 9,183,809 | B2 | 11/2015 | Jeong et al. | |
| 10,482,831 | B2 | 11/2019 | Kim et al. | |
| 10,943,522 | B1 | 3/2021 | Iwase et al. | |
| 2004/0146581 | A1 | 7/2004 | Morita | |
| 2005/0001805 | A1 | 1/2005 | Jeon et al. | |
| 2005/0068477 | A1 | 3/2005 | Shin et al. | |
| 2005/0140806 | A1 | 6/2005 | Nam | |
| 2005/0243044 | A1 | 11/2005 | Kang et al. | |
| 2007/0097072 | A1 * | 5/2007 | Kim | G09G 3/3614 345/103 |
| 2008/0001889 | A1 * | 1/2008 | Chun | G09G 3/2011 345/96 |
| 2008/0024712 | A1 | 1/2008 | Kim | |
| 2008/0068516 | A1 | 3/2008 | Mori et al. | |
| 2008/0186421 | A1 * | 8/2008 | Park | G02F 1/13454 349/37 |
| 2008/0266225 | A1 | 10/2008 | Kim | |
| 2010/0002023 | A1 | 1/2010 | Mitsuru et al. | |
| 2010/0156947 | A1 * | 6/2010 | Moon | G09G 3/3648 345/88 |
| 2011/0012887 | A1 | 1/2011 | Lee et al. | |
| 2011/0175884 | A1 | 7/2011 | Ono | |
| 2013/0093739 | A1 * | 4/2013 | Kim | G09G 3/3648 345/206 |
| 2017/0061844 | A1 * | 3/2017 | Wang | G09G 3/3648 |
| 2017/0249914 | A1 | 8/2017 | Kim et al. | |
| 2020/0058258 | A1 | 2/2020 | Kim et al. | |
| 2022/0005405 | A1 | 1/2022 | Aoki et al. | |

FOREIGN PATENT DOCUMENTS

| | | |
|---|---|---|
| KR | 10-2011-0006770 | 1/2011 |
| KR | 10-2011-0014016 | 2/2011 |
| KR | 10-1341906 | 12/2013 |
| KR | 10-2015638 | 8/2019 |

* cited by examiner

DISPLAY APPARATUS

CROSS-REFERENCE TO RELATED APPLICATIONS

This Division of co-pending U.S. patent application Ser. No. 16/664,250, filed on Oct. 25, 2019, which is a Division of U.S. patent application Ser. No. 15/440,425, filed on Feb. 23, 2017, which claims priority under 35 U.S.C. § 119 to Korean Patent Application No. 10-2016-0022713, filed on Feb. 25, 2016, in the Korean Intellectual Property Office, the disclosures of which are incorporated by reference herein in their entireties.

TECHNICAL FIELD

Exemplary embodiments of the present invention relate to a display apparatus. More particularly, Exemplary embodiments of the present invention relate to a display apparatus having a connection arrangement that increases display quality.

DISCUSSION OF THE RELATED ART

Generally, a liquid crystal display (LCD) apparatus is thin, light, and power-efficient. LCD apparatuses are used in monitors, laptop computers, cellular phones, etc. An LCD apparatus includes an LCD panel to display images using a light transmittance of a liquid crystal, a backlight assembly disposed under the LCD panel to provide light to the LCD panel, and a driving circuit to drive the LCD panel.

The LCD panel includes an array substrate, which includes a gate line, a data line, a thin film transistor and a pixel electrode, and an opposing substrate, which includes a common electrode. In addition, the LCD panel includes a liquid crystal layer disposed between the array substrate and opposing substrate. A pixel of the LCD panel includes a liquid crystal capacitor and a storage capacitor. The liquid crystal capacitor includes a pixel electrode, the liquid crystal layer and a common electrode. The storage capacitor includes the pixel electrode and a storage electrode overlapping with the pixel electrode. The liquid crystal capacitor charges a data voltage to display a grayscale. The storage capacitor maintains the data voltage charged in the liquid crystal capacitor during a frame period.

The LCD panel may be driven in a polarity inversion mode, in which a polarity of a data voltage may be reversed by a pixel and a frame. In the polarity inversion mode, display defects such as a moving line defect and luminance difference across the LCD panel may occur.

SUMMARY

Exemplary embodiments of the present invention relate to a display apparatus having an increased display quality.

According to an exemplary embodiment of the present invention, a display apparatus includes a plurality of pixels arranged in rows and columns, wherein each pixel column extends in a first direction and each pixel row extends in a second direction crossing the first direction, a first data line extending in the first direction and configured to transfer a data voltage to pixels included in at least two pixel columns, and for each pixel row, a first gate line extending in the second direction and disposed at a first side of the pixel row, and a second gate line extending in the second direction and disposed at a second side of the pixel row, wherein the first and second sides of the pixel row are opposite to each other.

In a pair of adjacent pixel columns, pixels, which are connected to the first gate line of their respective pixel row, are arranged in a zigzag arrangement in the first direction.

According to an exemplary embodiment of the present invention, a display apparatus includes a plurality of pixels arranged in a plurality of pixel rows and a plurality of pixel columns, a first data line extending in a first direction and configured to transfer a data voltage to pixels in at least two adjacent pixel columns, the first direction corresponding to a first side of a first pixel of a first pixel row, wherein the first data line is connected to the first pixel of the first pixel row, a first gate line extending in a second direction crossing the first direction, wherein the first gate line is disposed at a first side of the first pixel row and is connected to the first pixel of the first pixel row, wherein the second direction corresponds to a second side of first pixel of the first pixel row, the second side of the first pixel of the first pixel row being longer than the first side of the first pixel of the first pixel row, and a second gate line extending in the second direction, wherein the second gate line is disposed at the first side of the first pixel row adjacent to the first gate line, and the second gate line is connected to a second pixel of the first pixel row.

According to an exemplary embodiment of the present invention, a display apparatus includes a plurality of pixels arranged in a plurality of pixel rows and a plurality of pixel columns and including red, green and blue pixels, a first data line extending in a first direction and configured to transfer a data voltage to pixels in at least two adjacent pixel columns, a first gate line extending in a second direction crossing the first direction, the first gate line being disposed at a first side portion of a first pixel row and connected to red pixels of the first pixel row, and a second gate line extending in the second direction, the second gate line being disposed at a second side portion of the first pixel row, the first and second side portions of the first pixel row being opposite to each other, wherein the second gate line is connected to the green pixels of the first pixel row.

According to an exemplary embodiment of the present invention, a display apparatus includes a plurality of pixels arranged in rows and columns, a first data line extending in a first direction and a second data line adjacent to the first data line, the second data line extending in the first direction and spaced apart from the first data line by at least two columns of pixels, wherein each column of pixels is arranged in the first direction, first and second pixels disposed in a first row of pixels between the first and second data lines, wherein each row of pixels is arranged in a second direction crossing the first direction, and a first gate line and a second gate line extending in the second direction, wherein the first row of pixels is disposed between the first and second gate lines, third and fourth pixels disposed in a second row of pixels between the first and second data lines, and a third gate line and a fourth gate line extending in the second direction, wherein the second row of pixels is disposed between the third and fourth gate lines, and fifth and sixth pixels disposed in a third row of pixels between the first and second data lines, and a fifth gate line and a sixth gate line extending in the second direction, wherein the third row of pixels is disposed between the fifth and sixth gate lines. The first pixel is connected to the first data line and the second gate line, the second pixel is connected to the first data line and the first gate line, the third pixel is connected to the second data line and the third gate line, the fourth pixel is connected to the second data line and the fourth gate line, the fifth pixel is connected to the first data line and the sixth gate line, and the sixth pixel is connected to the first data line and the fifth gate line. The first, second and third rows of pixels are consecutively arranged.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Hereinafter, exemplary embodiments of the present invention will be described in detail with reference to the accompanying drawings.

Figure 1:
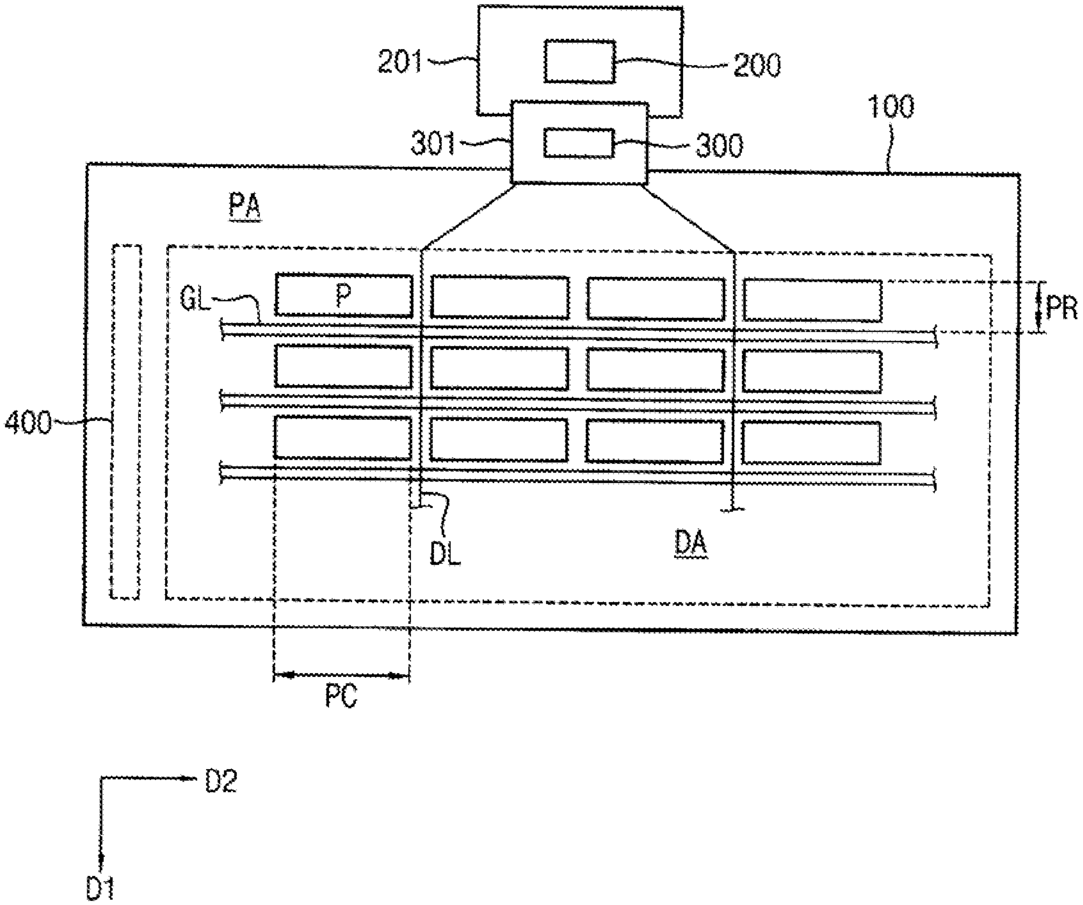
FIG. 1 is a plan view illustrating a display apparatus according to an exemplary embodiment of the present invention.
Figure 2:
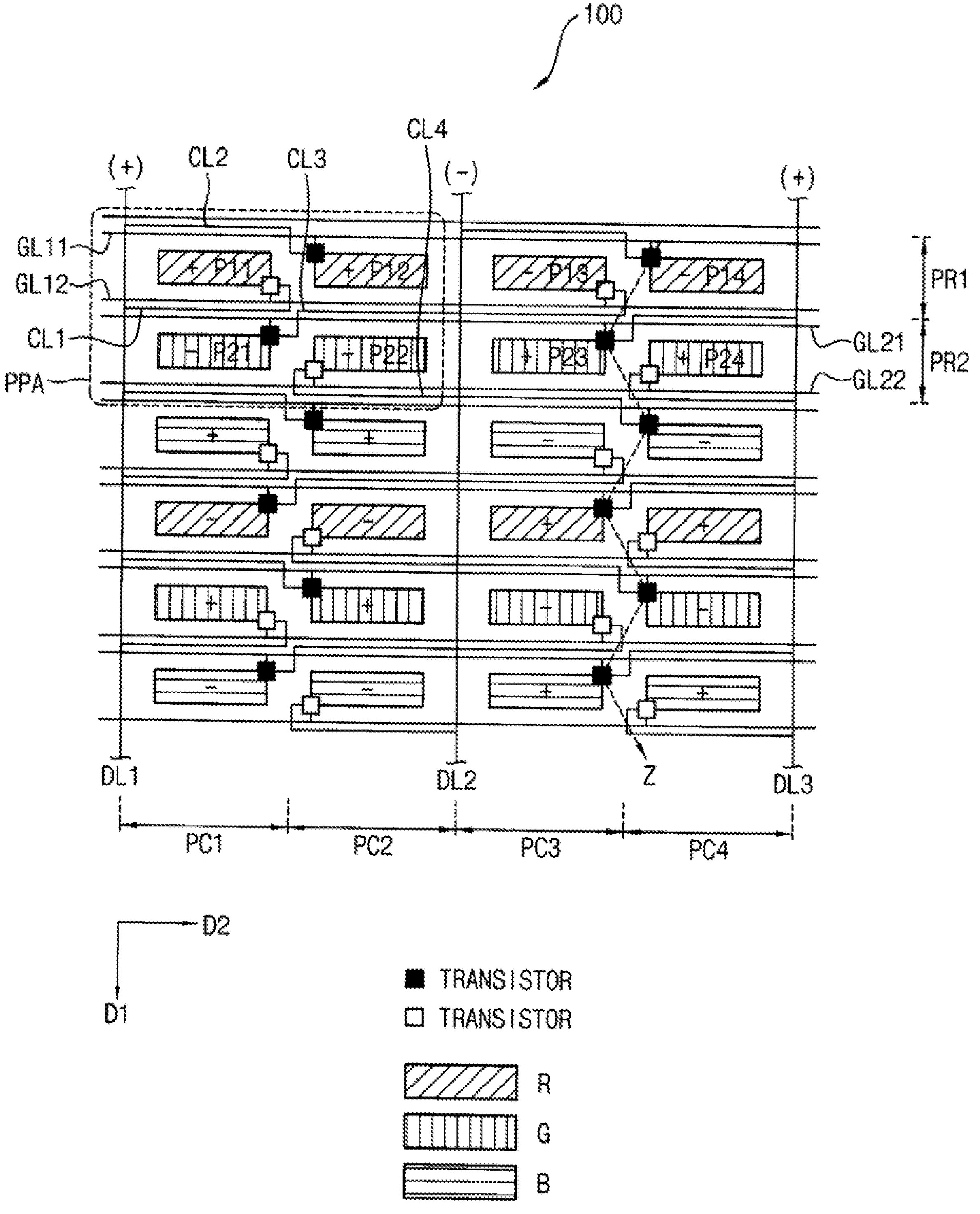
FIG. 2 is a diagram illustrating a pixel structure of a display panel according to an exemplary embodiment of the present invention.

FIG. 1 is a plan view illustrating a display apparatus according to an exemplary embodiment of the present invention. FIG. 2 is a diagram illustrating a pixel structure of a display panel according to an exemplary embodiment of the present invention.

Referring to FIGS. 1 and 2, the display apparatus may include a display panel 100, a timing controller 200, a data driver 300 and a gate driver 400.

The display panel 100 may include a display area DA and a peripheral area PA disposed at a border of the display area DA.

A plurality of pixels P is arranged in the display area DA. The plurality of pixels P may be arranged in a matrix which includes a plurality of pixel rows PR and a plurality of pixel columns PC. The plurality of pixels P may be connected to a plurality of data lines DL and a plurality of gate lines GL.

The plurality of data lines DL may extend in a first direction D1, corresponding to a first side (e.g., a short side) of a pixel P, and may be arranged in a second direction D2, corresponding to a second side (e.g., a long side) of the pixel P. The plurality of gate lines GL may extend in the second direction D2, and may be arranged in the first direction D1.

A plurality of pixels in at least two adjacent pixel columns PC may receive a data voltage through the same data line DL. A plurality of pixels in a same pixel row PR may receive a gate signal through at least two adjacent gate lines GL.

The timing controller 200 may be mounted on a printed circuit board 201, and may be configured to control an operation of the display apparatus. For example, the timing controller 200 may be configured to generate a data control signal to control the data driver 300 and to provide the data driver 300 with the data control signal. The timing controller 200 may be configured to generate a gate control signal to control the gate driver 400 and to provide the gate driver 400 with the gate control signal.

The data driver 300 may be mounted on a flexible circuit board 301. The flexible circuit board 301 may electrically connect the printed circuit board 201, including the timing controller 200 thereon, to the display panel 100. The data driver 300 may be configured to convert image data into a data voltage having a first polarity, (e.g., a positive polarity (+)) or a second polarity (e.g., a negative polarity (−)). The second polarity may be opposite to the first polarity with respect to a reference voltage. The data driver 300 may output the data voltage.

The gate driver 400 may be disposed in the peripheral area PA of the display panel 100. In addition, the gate driver 400 may be mounted on the flexible circuit board 301. The gate driver 400 may be formed, for example, using the same process used in forming a transistor of the pixel P in the display area DA.

According to the exemplary embodiment of the present invention, the data lines DL extend in the first direction D1, corresponding to the short side of the pixel P. Thus, the number of the data lines DL may be about ⅓ of the number of gate lines GL, which extend in the second direction D2. In addition, the pixels in at least two adjacent pixel columns PC may be connected to the same data line DL. Thus, the number of the data lines DL may be decreased to about ⅙ of the number of gate lines GL.

Therefore, by decreasing the number of the data lines DL, the number of the data drivers 300, which drive the data lines DL, may be decreased.

Referring to FIG. 2, the display panel 100 may include a repetitive pixel structure PPA.

The display panel 100 may include a first data line DL1, a second data line DL2, a first upper-side gate line GL11, a first lower-side gate line GL12, a second upper-side gate line GL21, a second lower-side gate line GL22, an 11-th pixel P11, a 12-th pixel P12, a 21-st pixel P21, a 22-nd pixel P22, a first data connection line CL1, a second data connection line CL2, a third data connection line CL3 and a fourth data connection line CL4.

During an N-th frame ('N' is a positive integer), the first data line DL1 receives a data voltage of a first polarity (+). The first data line DL1 transfers the data voltage of the first polarity (+) to pixels which are included in two pixel columns PC adjacent to a left-side of the first data line DL1, and to two pixel columns PC1 and PC2, disposed adjacent to a right-side of the first data line DL1.

The second data line DL2 receives a data voltage of the second polarity (−), opposite to the first polarity (+). The second data line DL2 transfers the data voltage of the second polarity (−) to pixels which are included in the first and second pixel columns PC1 and PC2, adjacent to a left-side of the second data line DL2, and to third and fourth pixel columns PC3 and PC4, which are respectively disposed adjacent to a right-side of the second data line DL2.

During the N-th frame, the plurality of data lines DL1, DL2 and DL3 alternately receive the data voltage of the first polarity (+) and the data voltage of the second polarity (−), based on a column inversion mode.

The first upper-side gate line GL11 is disposed at an upper-side portion of a first pixel row PR1 and the first lower-side gate line GL12 is disposed at a lower-side portion of the first pixel row PR1. The first upper-side and lower-side gate lines GL11 and GL12 transfer a gate signal to the pixels in the first pixel row PR1.

The second upper-side gate line GL21 is disposed at an upper-side portion of the second pixel row PR2 and the second lower-side gate line GL22 is disposed at a lower-side portion of the second pixel row PR2. The second upper-side and lower-side gate lines GL21 and GL22 transfer a gate signal to the pixels in the second pixel row PR2.

The 11-th pixel P11 and the 12-th pixel P12 are included in the first pixel row PR1. The 21-st pixel P21 and the 22-nd pixel P22 are included in the second pixel row PR2.

In addition, the 11-th pixel P11 and the 21-st pixel P21 are included in the first pixel column PC1. The 12-th pixel P12 and the 22-nd pixel P22 are included in the second pixel column PC2.

The 11-th pixel P11 includes a transistor, and the transistor is connected to the first data connection line CL1 and the first lower-side gate line GL12. The first data connection line CL1 is connected to the first data line DL1, adjacent to the first lower-side gate line GL12, and the first data connection line CL1 extends in the second direction D2. According to an exemplary embodiment of the present invention, the second direction D2 may correspond to the longer-side of the pixel P11, P12, P21 and P22. The transistor is located at an outer portion of the 11-th pixel P11, adjacent to the 12-th pixel P12.

The 12-th pixel P12 includes a transistor, and the transistor is connected to the second data connection line CL2 and the first upper-side gate line GL11. The second data connection line CL2 is connected to the first data line DL1, adjacent to the first upper-side gate line GL11. The second data connection line CL2 extends in the second direction D2. The transistor is located at an outer portion of the 12-th pixel P12, adjacent to the 11-th pixel P11. The second data connection line CL2 may have a length equal to a length of the first data connection line CL1. Therefore, the first and second data connection lines CL1 and CL2 may have a same line resistance. Accordingly, a difference between coupling capacitances Cgs of the transistors may be compensated.

The 21-st pixel P21 includes a transistor, and the transistor is connected to the third data connection line CL3 and second upper-side gate line GL21. The third data connection line CL3 is connected to the second data line DL2, adjacent to the second upper-side gate line GL21. The third data connection line CL3 extends in the second direction D2. The transistor is located at an outer portion of the 21-st pixel P21 adjacent to the 22-nd pixel P22.

The 22-nd pixel P22 includes a transistor, and the transistor is connected to the fourth data connection line CL4 and the second lower-side gate line GL22. The fourth data connection line CL4 is connected to the second data line DL2, adjacent to the second lower-side gate line GL22. The fourth data connection line CL4 extends in the second direction D2. The transistor of the 22-nd pixel P22 is located at an outer portion of the 22-nd pixel P22, adjacent to the 21-st pixel P21. The fourth data connection line CL4 may have a length equal to a length of the third data connection line CL3. Therefore, the third and fourth data connection lines CL3 and CL4 may have a same line resistance. Thus, a difference between coupling capacitances Cgs of the transistors may be compensated.

According to the exemplary embodiment of the present invention, during the N-th frame, data lines may alternately receive the data voltages having the first and second polarities (+) and (−) based on the column inversion mode. Thus, the display panel 100 may display an image having the polarity inversion pattern of the (2 by 1)-type. Therefore, the display apparatus is driven with the column inversion mode, Thus, the display apparatus may have decreased power consumption. In addition, moving line defects observed by a vertical line having a same polarity in successive frames may be eliminated by the polarity inversion pattern of the (2 by 1)-type. For example, the (2 by 1)-type may indicate that two pixels, arranged in two columns and one row, have the same polarity.

According to the exemplary embodiment of the present invention, as shown in FIG. 2, upper-side pixels (or lower-side pixels) connected to their respective upper-side gate line (or lower-side gate line), among the pixels in two adjacent pixel columns, are arranged in the first direction D1 (corresponding to the shorter-side of the pixels) as a zigzag type Z (e.g., in a zigzag arrangement Z). For example, when the upper-side gate line is driven prior to the lower-side gate line, a pixel connected to the upper-side gate line is influenced by all first and second kickback voltages, and a pixel connected to the lower-side gate line is influenced by only first kickback voltage. As described above, the pixel connected to the upper-side gate line and the pixel connected to the lower-side gate line are uniformly arranged. Thus, a charge difference by the first and second kickback voltages may be eliminated. Accordingly, a luminance difference by the charge difference may be eliminated. In addition, in an exemplary embodiment of the present invention, the transistors of the pixels arranged in the zigzag arrangement Z may be disposed in the same side (e.g., upper side or lower side) of their respective pixel row. For example, the transistor of the 14-th pixel P14 may be disposed on the upper side of the first pixel row PR1, the transistor of the 23-nd pixel P23 may be disposed on the upper side of the second pixel row PR2, etc.

In addition, according to an exemplary embodiment of the present invention, the transistors of the 11-th pixel P11, 12-th pixel P12, 21-st pixel P21 and 22-nd pixel P22 are located in a boundary area of the first and second pixel columns PC1 and PC2. Thus, a shading area, e.g., a BM (black matrix) area may be decreased.

Figure 3:
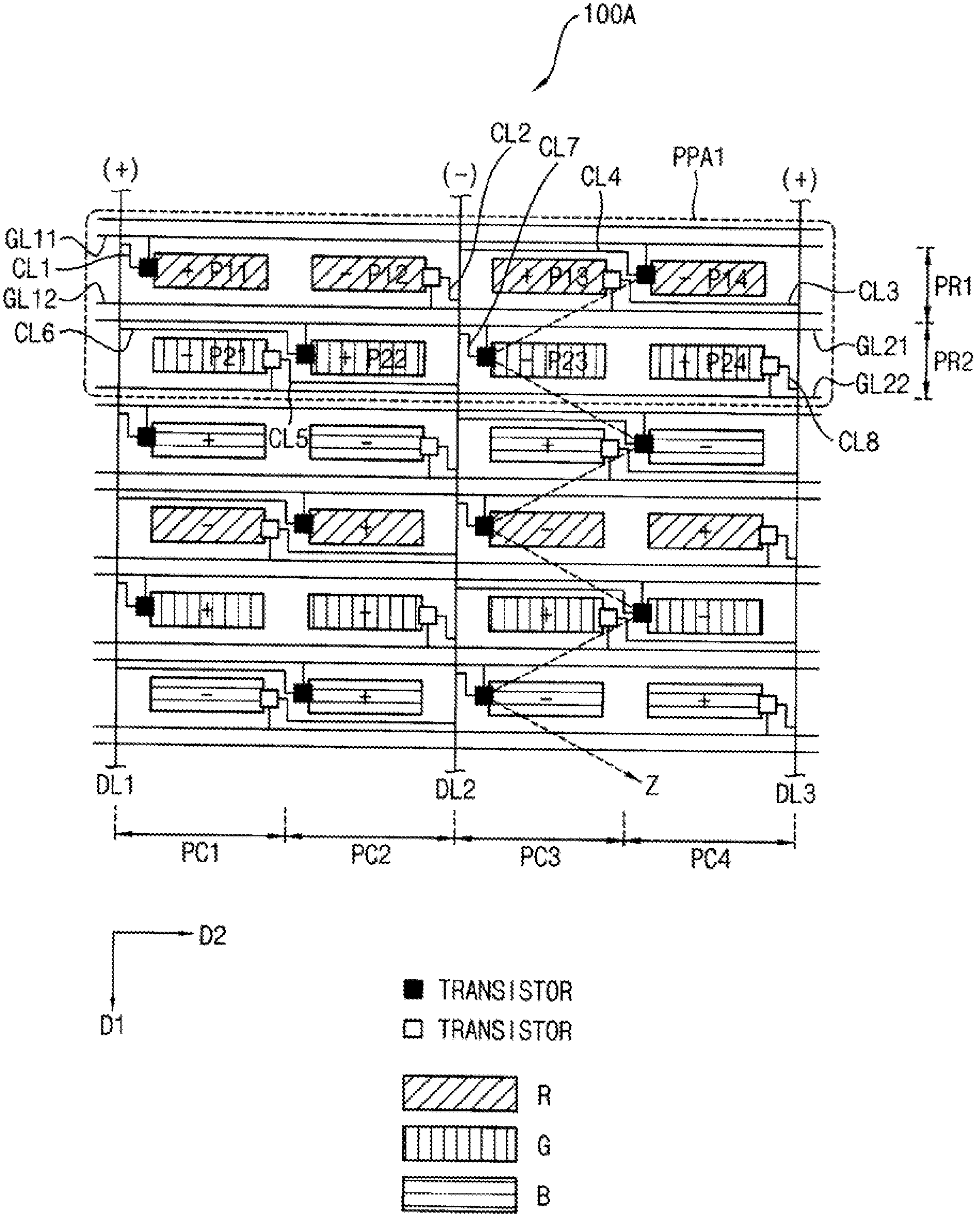
FIG. 3 is a diagram illustrating a pixel structure of a display panel according to an exemplary embodiment of the present invention.

FIG. 3 is a diagram illustrating a pixel structure of a display panel according to an exemplary embodiment of the present invention.

Referring to FIGS. 1 and 3, a display panel 100A may include a repetitive pixel structure PPA1. The display panel 100A may include a first data line DL1, a second data line DL2, a third data line DL3, a first upper-side gate line GL11, a first lower-side gate line GL12, a second upper-side gate line GL21, a second lower-side gate line GL22, an 11-th pixel P11, a 12-th pixel P12, a 13-th pixel P13, a 14-th pixel P14, a 21-st pixel P21, a 22-nd pixel P22, a 23-rd pixel P23, a 24-th pixel P24, a first data connection line CL1, a second data connection line CL2, a third data connection line CL3 and a fourth data connection line CL4.

During an N-th frame, the first data line DL1 receives a data voltage of a first polarity (+). The first data line DL1 transfers the data voltage of the first polarity (+) to pixels which are included in two pixel columns adjacent to a left-side of the first data line DL1 and in two pixel columns PC1 and PC2 adjacent to a right-side of the first data line DL1.

The second data line DL2 receives a data voltage of the second polarity (−), opposite to the first polarity (+). The second data line DL2 transfers the data voltage of the second polarity (−) to pixels which are included in the first and second pixel columns PC1 and PC2, adjacent to a left-side of the second data line DL2, and to third and fourth pixel columns PC3 and PC4, adjacent to a right-side of the second data line DL2.

The third data line DL3 receives a data voltage of a first polarity (+). The third data line DL3 transfers the data voltage of the first polarity (+) to pixels which are included in third and fourth pixel columns PC3 and PC4, adjacent to a left-side of the third data line DL3 and in two pixel columns adjacent to a right-side of the third data line DL3.

The first upper-side gate line GL11 is disposed at an upper-side portion of a first pixel row PR1 and the first lower-side gate line GL12 is disposed at a lower-side portion of the first pixel row PR1. The first upper-side and lower-side gate lines GL11 and GL12 transfer a gate signal to the pixels in the first pixel row PR1.

The second upper-side gate line GL21 is disposed at an upper-side portion of the second pixel row PR2 and the second lower-side gate line GL22 is disposed at a lower-side portion of the second pixel row PR2. The second upper-side and lower-side gate lines GL21 and GL22 transfer a gate signal to the pixels in the second pixel row PR2.

The 11-th pixel P11, the 12-th pixel P12, the 13-th pixel P13 and the 14-th pixel P14 are included in the first pixel row PR1. The 21-st pixel P21, the 22-nd pixel P22, the 23-rd pixel P23 and the 24-th pixel P24 are included in the second pixel row PR2.

In addition, the 11-th pixel P11 and the 21-st pixel P21 are included in the first pixel column PC1. The 12-th pixel P12 and the 22-nd pixel P22 are included in the second pixel column PC2. The 13-th pixel P13 and the 23-rd pixel P23 are included in the third pixel column PC3. The 14-th pixel P14 and the 24-th pixel P24 are included in the fourth pixel column PC4.

The 11-th pixel P11 includes a transistor, and the transistor is connected to the first data connection line CL1 and the first upper-side gate line GL11. The first data connection line CL1 is connected to the first data line DL1.

The 12-th pixel P12 includes a transistor, and the transistor is connected to the second data connection line CL2 and the first lower-side gate line GL12. The second data connection line CL2 is connected to the second data line DL2. The second data connection line CL2 may have a length equal to a length of the first data connection line CL1. Therefore, the first and second data connection lines CL1 and CL2 may have a same line resistance. Thus, a difference between coupling capacitances Cgs of the transistors may be compensated.

The 13-th pixel P13 includes a transistor, and the transistor is connected to the third data connection line CL3 and the first lower-side gate line GL12. The third data connection line CL3 is connected to the third data line DL3.

The 14-th pixel P14 includes a transistor, and the transistor is connected to the fourth data connection line CL4 and the first upper-side gate line GL11. The fourth data connection line CL4 is connected to the second data line DL2. The third data connection line CL3 may have a length equal to a length of the fourth data connection line CL4. The third and fourth data connection lines CL3 and CL4 extend in the second direction D2. The second direction D2 may correspond to the longer-side of the pixels. Therefore, the third and fourth data connection lines CL3 and CL4 may have a same line resistance. Thus, a difference between coupling capacitances Cgs of the transistors may be compensated.

The 21-st pixel P21 includes a transistor, and the transistor is connected to the fifth data connection line CL5 and the second lower-side gate line GL22. The fifth data connection line CL5 is connected to the second data line DL2.

The 22-nd pixel P22 includes a transistor, and the transistor is connected to the sixth data connection line CL6 and the second upper-side gate line GL21. The sixth data connection line CL6 is connected to the first data line DL1. The sixth data connection line CL6 may have a length equal to a length of the fifth data connection line CL5. The fifth and sixth data connection lines CL5 and CL6 extend in the second direction D2. Therefore, the fifth and sixth data connection lines CL5 and CL6 may have a same line resistance. Thus, a difference between coupling capacitances Cgs of the transistors may be compensated.

The 23-rd pixel P23 includes a transistor, and the transistor is connected to the seventh data connection line CL7 and the second upper-side gate line GL21. The seventh data connection line CL7 is connected to the second data line DL2.

The 24-th pixel P24 includes a transistor, and the transistor is connected to the eighth data connection line CL8 and the second lower-side gate line GL22. The eighth data connection line CL8 is connected to the third data line DL3. The seventh data connection line CL7 may have a length equal to a length of the eighth data connection line CL8. Therefore, the seventh and eighth data connection lines CL7 and CL8 may have a same line resistance. Thus, a difference between coupling capacitances Cgs of the transistors may be compensated.

According to an exemplary embodiment of the present invention, during the N-th frame, data lines may alternately receive the data voltages having the first and second polarities (+) and (−) based on the column inversion mode. Thus, the display panel 100A may display an image having the polarity inversion pattern of the (1 by 1)-type. For example, the (1 by 1)-type may indicate that when a first pixel has a first polarity, an adjoining pixel, whether in the first direction D1 or the second direction D2, has a second polarity opposite to the first polarity. Therefore, the display apparatus is driven with the column inversion mode. Accordingly, the display apparatus may decrease power consumption. In addition, moving line defects observed by a vertical line having a same polarity in successive frames may be eliminated by the polarity inversion pattern of the (1 by 1)-type.

Figure 4:
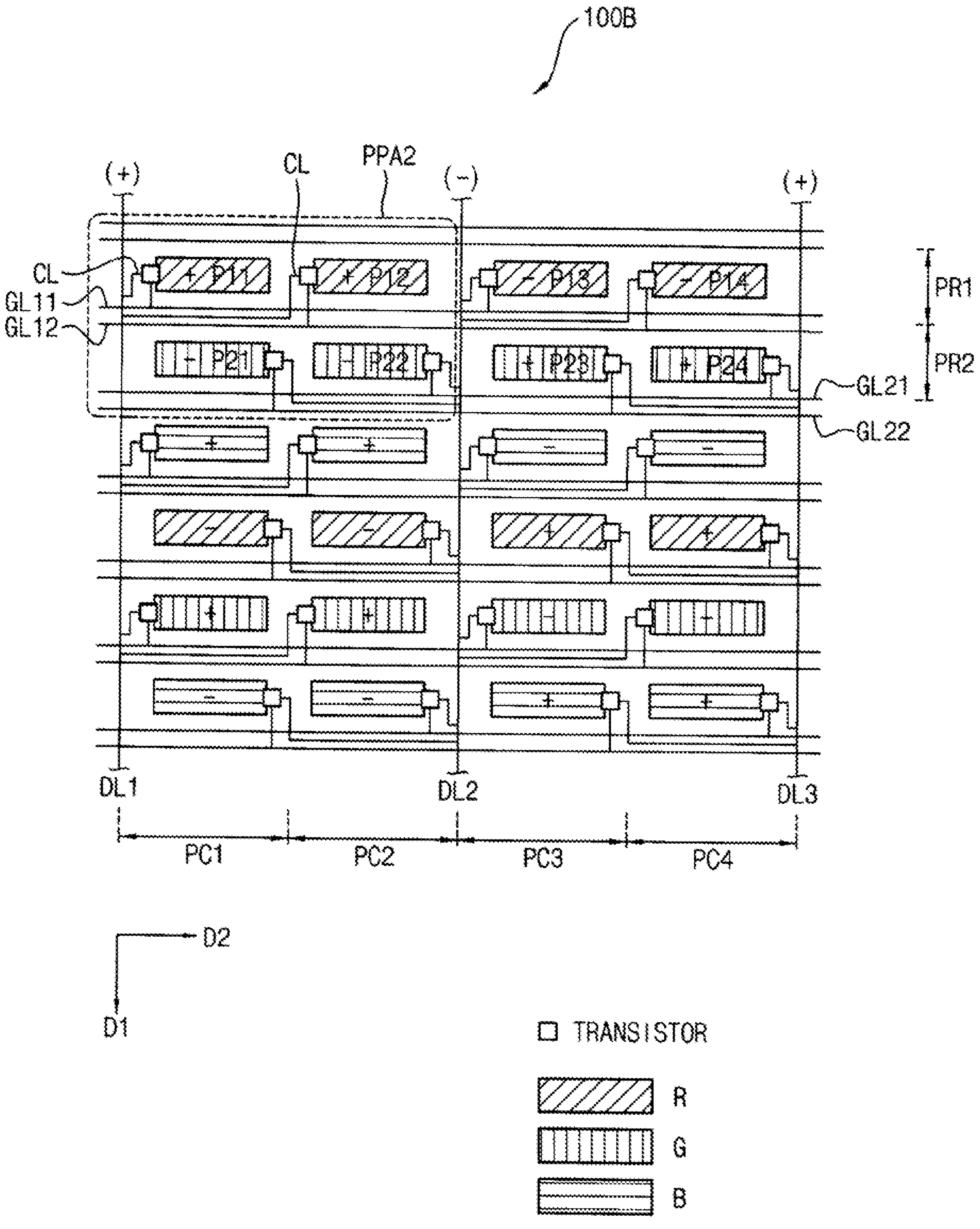
FIG. 4 is a diagram illustrating a pixel structure of a display panel according to an exemplary embodiment of the present invention.

FIG. 4 is a diagram illustrating a pixel structure of a display panel according to an exemplary embodiment of the present invention.

Referring to FIGS. 1 and 4, a display panel 100B may include a repetitive pixel structure PPA2. The display panel 100B may include a first data line DL1, a second data line DL2, an 11-th lower-side gate line GL11, a 12-th lower-side gate line GL12, a 21-st lower-side gate line GL21, a 22-nd lower-side gate line GL22, an 11-th pixel P11, a 12-th pixel P12, a 21-st pixel P21, a 22-nd pixel P22 and a plurality of data connection lines CL.

During an N-th frame, the first data line DL1 receives a data voltage of a first polarity (+). The first data line DL1 transfers the data voltage of the first polarity (+) to pixels which are included in two pixel columns adjacent to a left-side of the first data line DL1 and to two pixel columns PC1 and PC2 adjacent to a right-side of the first data line DL1.

The second data line DL2 receives a data voltage of the second polarity (−), opposite to the first polarity (+). The second data line DL2 transfers the data voltage of the second polarity (−) to pixels which are included in the first and second pixel columns PC1 and PC2, adjacent to a left-side of the second data line DL2, and to the third and fourth pixel columns PC3 and PC4, adjacent to a right-side of the second data line DL2.

During the N-th frame, a plurality of data lines DL1, DL2 and DL3 alternately receive the data voltage of the first polarity (+) and the data voltage of the second polarity (−) based on the column inversion mode.

The 11-th lower-side gate line GL11 is disposed at a first lower-side portion of the first pixel row PR1 and the 12-th lower-side gate line GL12 is disposed at the first lower-side portion of the first pixel row PR1. The 11-th and 12-th lower-side gate lines GL11 and GL12 transfer a gate signal to the pixels in the first pixel row PR1.

The 21-st lower-side gate line GL21 is disposed at a first lower-side portion of the second pixel row PR2 and the 22-nd lower-side gate line GL22 is disposed at the first lower-side portion of the second pixel row PR2. The 21-st and 22-nd lower-side gate lines GL21 and GL22 transfer a gate signal to the pixels in the second pixel row PR2.

The 11-th pixel P11 and the 12-th pixel P12 are included in the first pixel row PR1. The 21-st pixel P21 and the 22-nd pixel P22 are included in the second pixel row PR2.

In addition, the 11-th pixel P11 and the 21-st pixel P21 are included in the first pixel column PC1. The 12-th pixel P12 and the 22-nd pixel P22 are included in the second pixel column PC2.

The 11-th pixel P11 includes a transistor, and the transistor is connected to a data connection line, which is connected to the first data line DL1, and the 11-th lower-side gate line GL11.

The 12-th pixel P12 includes a transistor, and the transistor is connected to a data connection line, which is connected to the first data line DL1, and the 12-th lower-side gate line GL12.

The 21-st pixel P21 includes a transistor, and the transistor is connected to a data connection line, which is connected to the second data line DL2, and the 22-nd lower-side gate line GL22.

The 22-nd pixel P22 includes a transistor, and the transistor is connected to a data connection line, which is connected to the second data line DL2, and the 21-st lower-side gate line GL21.

According to the exemplary embodiment of the present invention, pixels disposed in a pixel row are driven by two lower-side gate lines, which are disposed at the lower-side portion of the pixel row. Thus, the pixels disposed in a pixel row are influenced by a same kickback voltage. Thus, a luminance difference by a charge difference may be eliminated.

In addition, according to an exemplary embodiment of the present invention, data lines may alternately receive the data voltages having the first and second polarities (+) and (−) based on the column inversion mode. Thus, the display panel 100B may display an image having the polarity inversion pattern of the (2 by 1)-type. Therefore, the display apparatus is driven with the column inversion mode so that the display apparatus 100B may decrease power consumption, and the moving line defects may be eliminated by the polarity inversion pattern of the (2 by 1)-type.

Figure 5:
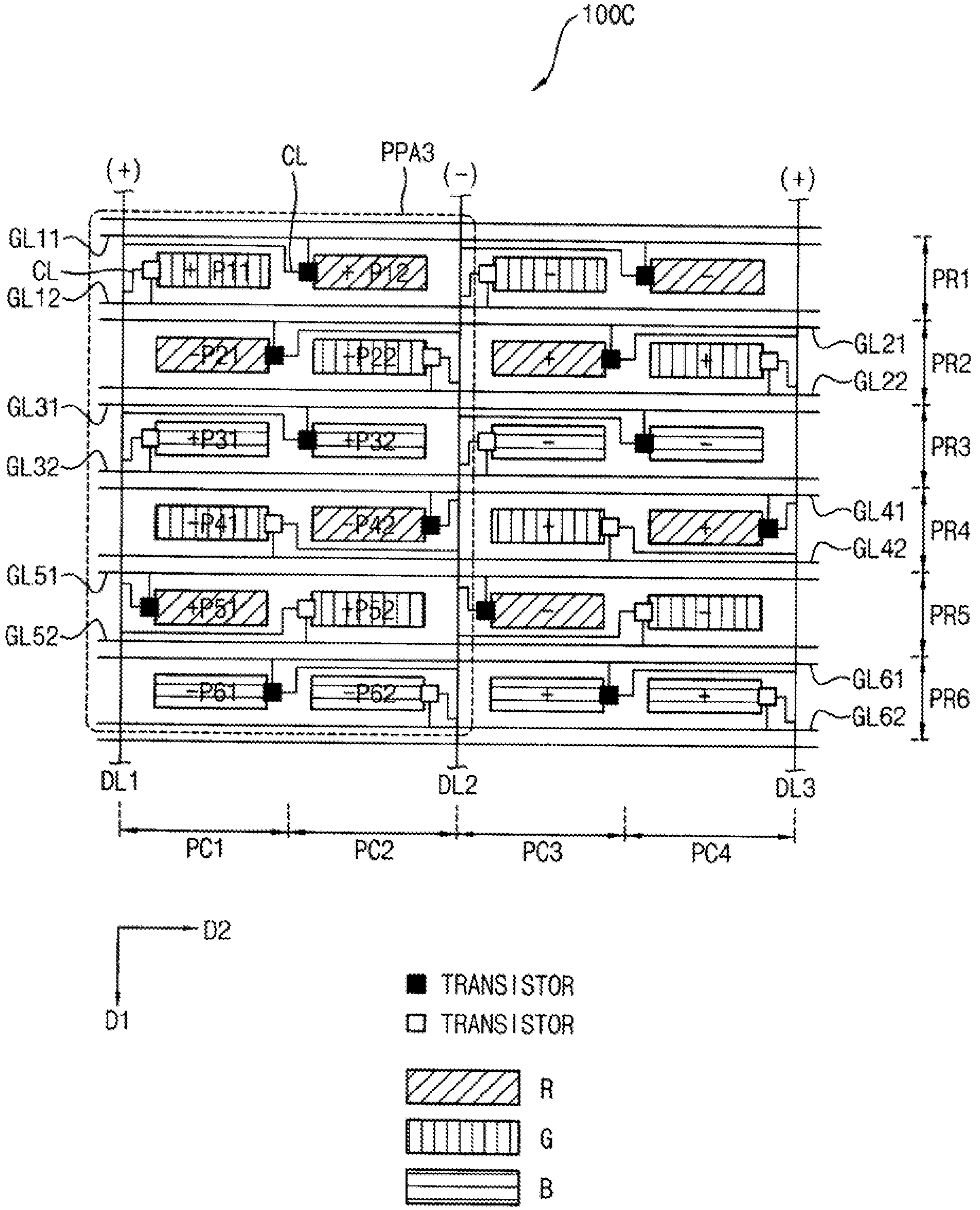
FIG. 5 is a diagram illustrating a pixel structure of a display panel according to an exemplary embodiment of the present invention.

FIG. 5 is a diagram illustrating a pixel structure of a display panel according to an exemplary embodiment of the present invention.

Referring to FIGS. 1 and 5, a display panel 100C may include a repetitive pixel structure PPA3. The display panel 100C may include a first data line DL1, a second data line DL2, a first upper-side gate line GL11, a first lower-side gate line GL12, a second upper-side gate line GL21, a second lower-side gate line GL22, a third upper-side gate line GL31, a third lower-side gate line GL32, a fourth upper-side gate line GL41, a fourth lower-side gate line GL42, a fifth upper-side gate line GL51, a fifth lower-side gate line GL52, a sixth upper-side gate line GL61, a sixth lower-side gate line GL62, an 11-th pixel P11, a 12-th pixel P12, a 21-st pixel P21, a 22-nd pixel P22, a 31-st pixel P31, a 32-nd pixel P32, a 41-st pixel P41, a 42-nd pixel P42, a 51-st pixel P51, a 52-nd pixel P52, a 61-st pixel P61, a 62-nd pixel P62 and a plurality of data connection lines CL.

During an N-th frame, the first data line DL1 receives a data voltage of a first polarity (+). The first data line DL1 transfers the data voltage of the first polarity (+) to pixels which are included in two pixel columns adjacent to a left-side of the first data line DL1 and to two pixel columns PC1 and PC2 adjacent to a right-side of the first data line DL1.

The second data line DL2 receives a data voltage of the second polarity (−), opposite to the first polarity (+). The second data line DL2 transfers the data voltage of the second polarity (−) to pixels which are included in the first and second pixel columns PC1 and PC2, adjacent to a left-side of the second data line DL2, and to the third and fourth pixel columns PC3 and PC4, adjacent to a right-side of the second data line DL2.

During the N-th frame, a plurality of data lines DL1, DL2 and DL3 alternately receive the data voltage of the first polarity (+) and the data voltage of the second polarity (−) based on the column inversion mode.

The first upper-side gate line GL11 is disposed at an upper-side portion of a first pixel row PR1, and the first lower-side gate line GL12 is disposed at a lower-side portion of the first pixel row PR1. The first upper-side and lower-side gate lines GL11 and GL12 transfer a gate signal to the pixels in the first pixel row PR1.

The second upper-side gate line GL21 is disposed at an upper-side portion of a second pixel row PR2 and the second lower-side gate line GL22 is disposed at a lower-side portion of the second pixel row PR2. The second upper-side and lower-side gate lines GL21 and GL22 transfer a gate signal to the pixels in the second pixel row PR2.

The third upper-side gate line GL31 is disposed at an upper-side portion of a third pixel row PR3 and the third lower-side gate line GL32 is disposed at a lower-side portion of the third pixel row PR3. The third upper-side and lower-side gate lines GL31 and GL32 transfer a gate signal to the pixels in the third pixel row PR3.

The fourth upper-side gate line GL41 is disposed at an upper-side portion of a fourth pixel row PR4 and the fourth lower-side gate line GL42 is disposed at a lower-side portion of the fourth pixel row PR4. The fourth upper-side and lower-side gate lines GL41 and GL42 transfer a gate signal to the pixels in the fourth pixel row PR4.

The fifth upper-side gate line GL51 is disposed at an upper-side portion of a fifth pixel row PR5 and the fifth lower-side gate line GL52 is disposed at a lower-side portion of the fifth pixel row PR5. The fifth upper-side and lower-side gate lines GL51 and GL52 transfer a gate signal to the pixels in the fifth pixel row PR5.

The sixth upper-side gate line GL61 is disposed at an upper-side portion of a sixth pixel row PR6 and the sixth lower-side gate line GL62 is disposed at a lower-side portion of the sixth pixel row PR6. The sixth upper-side and lower-side gate lines GL61 and GL62 transfer a gate signal to the pixels in the sixth pixel row PR6.

The 11-th pixel P11 and the 12-th pixel P12 are included in the first pixel row PR1. The 21-st pixel P21 and the 22-nd pixel P22 are included in the second pixel row PR2. The 31-st pixel P31 and the 32-nd pixel P32 are included in the third pixel row PR3. The 41-st pixel P41 and the 42-nd pixel P42 are included in the fourth pixel row PR4. The 51-st pixel P51 and the 52-nd pixel P52 are included in the fifth pixel row PR5. The 61-st pixel P62 and the 62-nd pixel P62 are included in the sixth pixel row PR6.

In addition, the 11-th pixel P11, the 21-st pixel P21, the 31-st pixel P31, the 41-st pixel P41, the 51-st pixel P51 and the 61-st pixel P61 are included in the first pixel column PC1. The 12-th pixel P12, the 22-nd pixel P22, the 32-nd pixel P32, the 42-nd pixel P42, the 52-nd pixel P52 and the 62-nd pixel P62 are included in the second pixel column PC2.

The 11-th pixel P11 includes a transistor, and the transistor is connected to a data connection line, which is connected to the first data line DL1, and the first lower-side gate line GL12.

The 12-th pixel P12 includes a transistor, and the transistor is connected to a data connection line, which is connected to the first data line DL1, and the first upper-side gate line GL11.

The 21-st pixel P21 includes a transistor, and the transistor is connected to a data connection line, which is connected to the second data line DL2, and the second upper-side gate line GL21.

The 22-nd pixel P22 includes a transistor, and the transistor is connected to a data connection line, which is connected to the second data line DL2, and the second lower-side gate line GL22.

The 31-st pixel P31 includes a transistor, and the transistor is connected to a data connection line, which is connected to the first data line DL1, and the third lower-side gate line GL32.

The 32-nd pixel P32 includes a transistor, and the transistor is connected to a data connection line, which is connected to the first data line DL1, and the third upper-side gate line GL31.

The 41-st pixel P41 includes a transistor, and the transistor is connected to a data connection line, which is connected to the second data line DL2, and the fourth lower-side gate line GL42.

The 42-nd pixel P42 includes a transistor, and the transistor is connected to a data connection line, which is connected to the second data line, and the fourth upper-side gate line GL41.

The 51-st pixel P51 includes a transistor, and the transistor is connected to a data connection line, which is connected to the first data line DL1, and the fifth upper-side gate line GL51.

The 52-nd pixel P52 includes a transistor, and the transistor is connected to a data connection line, which is connected to the first data line DL1, and the fifth lower-side gate line GL52.

The 61-st pixel P61 includes a transistor, and the transistor is connected to a data connection line, which is connected to the second data line DL2, and the sixth upper-side gate line GL61.

The 62-nd pixel P62 includes a transistor, and the transistor is connected to a data connection line, which is connected to the second data line DL2, and the sixth lower-side gate line GL62.

According to an exemplary embodiment of the present invention, a red pixel R and a green pixel G are alternately arranged in the same pixel row. For example, the first pixel row PR1 includes the red pixel R and the green pixel G, which are alternately arranged in the first pixel row PR1, and the second pixel row PR2 includes the red pixel R and the green pixel G, which are alternately arranged in the second pixel row PR2. In addition, the red pixels R and the green pixels G of the first and second pixel rows PR1 and PR2 are alternately arranged in the second direction D1, in each of the pixel columns PC1, PC2, PC3, and so on. A predetermined pixel row includes only blue pixels B. For example, a third pixel row PR3 includes only blue pixels B.

As shown in FIG. 5, the 12-th pixel P12, the 21-st pixel P21, the 42-nd pixel P42 and the 51-st pixel P51 are red pixels R. Each of the 12-th pixel P12, the 21-st pixel P21, the 42-nd pixel P42 and the 51-st pixel P51 is connected to a respective upper-side gate line. The 11-th pixel P11, the 22-nd pixel P22, the 41-st pixel P41 and the 52-nd pixel P52 are green pixels G. Each of the 11-th pixel P11, the 22-nd pixel P22, the 41-st pixel P41 and the 52-nd pixel P52 is connected to a respective lower-side gate line. The 31-st pixel P31, the 32-nd pixel P32, the 61-st pixel P61 and the 62-nd pixel P62 are blue pixels B. The 31-st pixel P31, the 32-nd pixel P32, the 61-st pixel P61 and the 62-nd pixel P62 are alternately connected to upper-side and lower-side gate lines.

The red pixels R are connected to the upper-side gate line and thus, the red pixels R are influenced by both first and second kickback voltages. The green pixels G are connected to the lower-side gate line and thus, the green pixels G are influenced only by the first kickback voltage. The blue pixels B are connected to all upper-side and lower-side gate lines and thus, the blue pixels B are influenced by both first and second kickback voltages.

As described above, red, green and blue pixels R, G and B may be subjected to different kickback voltages. In a luminance contribution, according to an exemplary embodiment of the present invention, the color green contributes about 70% of the luminance, the color red contributes about 20% of the luminance and the color blue contributes about 10% of the luminance. Thus, the green pixels G may contribute the largest luminance. According to an exemplary embodiment of the present invention, the green pixels G may be influenced by the kickback voltage the least, when compared to the blue pixels B and the red pixels R, since the green pixels G may be influenced, for example, only by the first kickback voltage. Thus, the display quality may be increased.

According to an exemplary embodiment of the present invention, data lines may alternately receive the data voltages having the first and second polarities (+) and (−) based on the column inversion mode and thus, the display panel 100C may display an image having the polarity inversion pattern of the (2 by 1)-type. Therefore, the display apparatus is driven with the column inversion mode so that the display apparatus may decrease power consumption, and the moving line defects may be eliminated by the polarity inversion pattern of the (2 by 1)-type.

Figure 6:
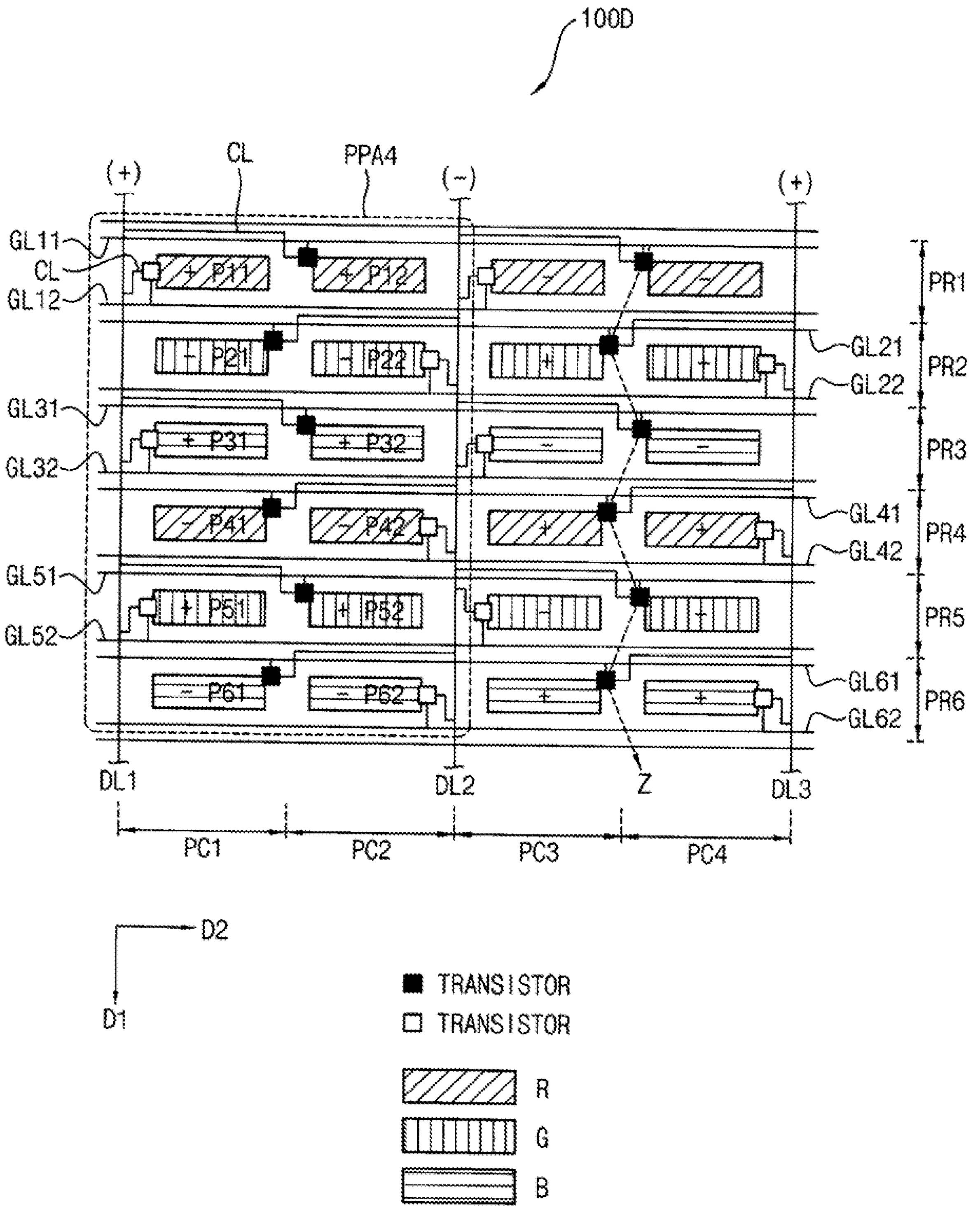
FIG. 6 is a diagram illustrating a pixel structure of a display panel according to an exemplary embodiment of the present invention.

FIG. 6 is a diagram illustrating a pixel structure of a display panel according to an exemplary embodiment of the present invention.

Referring to FIGS. 1 and 6, a display panel 100D may include a repetitive pixel structure PPA4. In comparison with the display panel 100C, according to an exemplary embodiment of the present invention, as shown in FIG. 5, the display panel 100D includes a predetermined pixel row which includes only red pixels R or only green pixels G. According to an exemplary embodiment of the present invention, a first pixel row PR1 includes only red pixels R and a second pixel row PR2 includes only green pixels G.

In addition, upper-side pixels (or lower-side pixels) connected to the upper-side gate line (or lower-side gate line), among the pixels in two adjacent pixel columns, are arranged in the first direction D1 as a zigzag type Z. The first direction D1 may correspond to a shorter-side of the pixels.

For example, the display panel 100D may include an 11-th pixel P11, a 12-th pixel P12, a 21-st pixel P21, a 22-nd pixel P22, a 31-st pixel P31, a 32-nd pixel P32, a 41-st pixel P41, a 42-nd pixel P42, a 51-st pixel P51, a 52-nd pixel P52, a 61-st pixel P61, a 62-nd pixel P62 and a plurality of data connection lines CL.

The 11-th pixel P11 and the 12-th pixel P12 are included in the first pixel row PR1, the 21-st pixel P21 and the 22-nd pixel P22 are included in the second pixel row PR2, the 31-st pixel P31 and the 32-nd pixel P32 are included in the third pixel row PR3, the 41-st pixel P41 and the 42-nd pixel P42 are included in the fourth pixel row PR4, the 51-st pixel P51 and the 52-nd pixel P52 are included in the fifth pixel row PR5, the 61-st pixel P62 and the 62-nd pixel P62 are included in the sixth pixel row PR6.

In addition, the 11-th pixel P11, the 21-st pixel P21, the 31-st pixel P31, the 41-st pixel P41, the 51-st pixel P51 and the 61-st pixel P61 are included in the first pixel column PC1. The 12-th pixel P12, the 22-nd pixel P22, the 32-nd pixel P32, the 42-nd pixel P42, the 52-nd pixel P52 and the 62-nd pixel P62 are included in the second pixel column PC2.

The 11-th pixel P11, 12-th pixel P12, 21-st pixel P21, 22-nd pixel P22, 31-st pixel P31 and 32-nd pixel P32 include transistors which have a connection structure being the same as that of the display panel 100C shown in FIG. 5. Thus, the connection structure of the transistors of the 11-th pixel P11, 12-th pixel P12, 21-st pixel P21, 22-nd pixel P22, 31-st pixel P31 and 32-nd pixel P32 will not be repeated for brevity.

However, the 41-st pixel P41 includes a transistor, and the transistor is connected to a data connection line, which is connected to the second data line DL2, and the fourth upper-side gate line GL41.

The 42-nd pixel P42 includes a transistor, and the transistor is connected to a data connection line, which is connected to the second data line DL2, and the fourth lower-side gate line GL42.

The 51-st pixel P51 includes a transistor, and the transistor is connected to a data connection line, which is connected to the first data line DL1, and the fifth lower-side gate line GL52.

The 52-nd pixel P52 includes a transistor, and the transistor is connected to a data connection line, which is connected to the first data line DL1, and the fifth upper-side gate line GL51.

The 61-st pixel P61 includes a transistor, and the transistor is connected to a data connection line, which is connected to the second data line DL2, and the sixth upper-side gate line GL61.

The 62-nd pixel P62 includes a transistor, and the transistor is connected to a data connection line, which is connected to the second data line DL2, and the sixth lower-side gate line GL62.

According to an exemplary embodiment of the present invention, upper-side pixels (or lower-side pixels) connected to the upper-side gate line (or lower-side gate line), among the pixels in two adjacent pixel columns, are arranged in the first direction D1 as a zigzag type Z. The first direction D1 may correspond to a shorter-side of the pixels. Therefore, the pixels connected to the upper-side gate line are influenced by the first and second kickback voltage, and the pixels connected to the lower-side gate line are influenced by the first kickback voltage. As described above, the pixels connected to the upper-side gate line and the pixels connected to the lower-side gate line are uniformly arranged so that a charge difference by the first and second kickback voltages may be eliminated. Thus, luminance difference by the charge difference may be eliminated.

According to an exemplary embodiment of the present invention, during an N-th frame, data lines may alternately receive the data voltages having the first and second polarities (+) and (−) based on the column inversion mode and thus, the display panel 100D may display an image having the polarity inversion pattern of the (2 by 1)-type. Therefore, the display apparatus is driven with the column inversion mode so that the display apparatus may decrease power consumption and the moving line defects may be eliminated by the polarity inversion pattern of the (2 by 1)-type.

Figure 7:
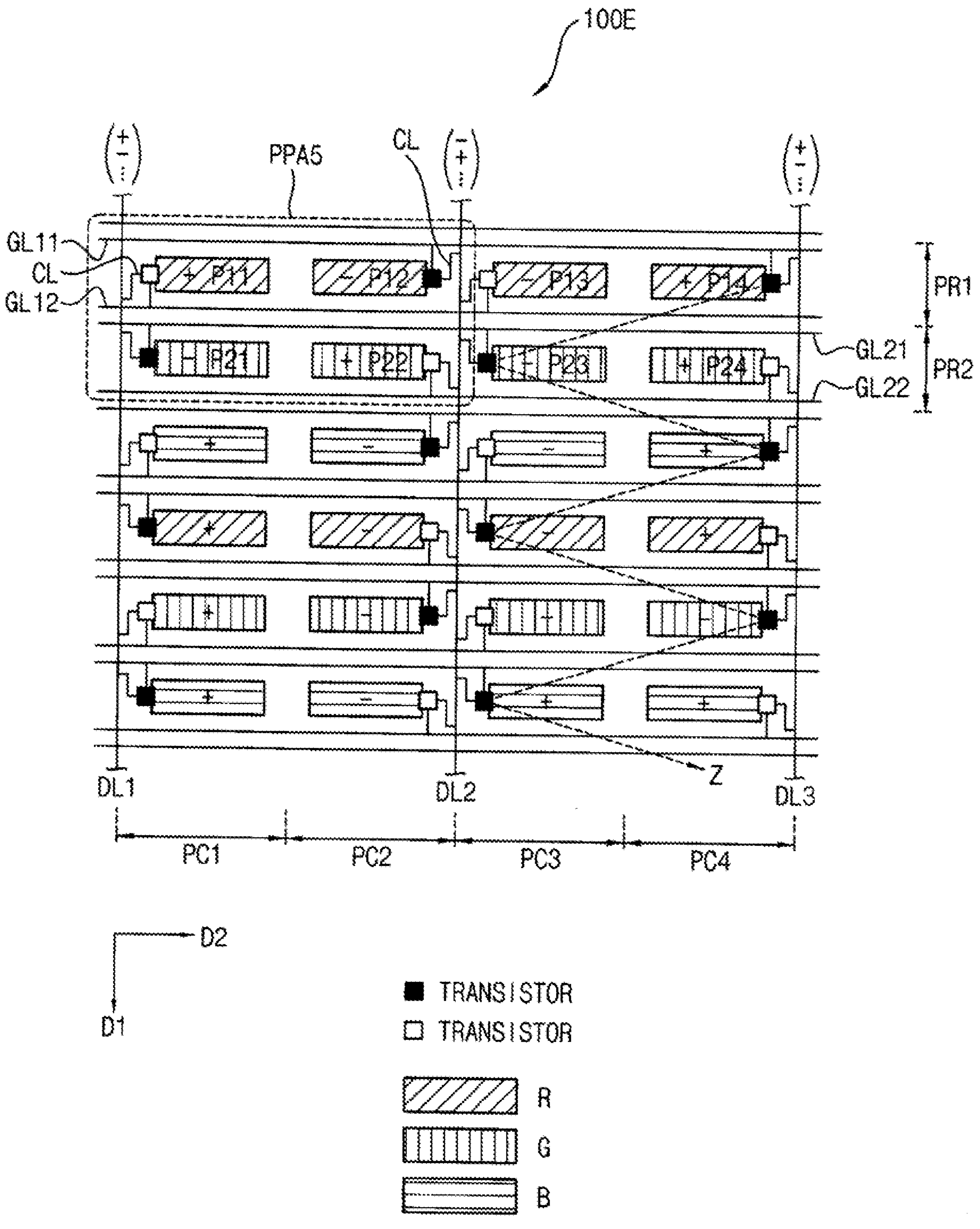
FIG. 7 is a diagram illustrating a pixel structure of a display panel according to an exemplary embodiment of the present invention.

FIG. 7 is a diagram illustrating a pixel structure of a display panel according to an exemplary embodiment of the present invention.

Referring to FIGS. 1 and 7, a display panel 100E may include a repetitive pixel structure PPA5.

The display panel 100E may include a first data line DL1, a second data line DL2, a third data line DL3, a first upper-side gate line GL11, a first lower-side gate line GL12, a second upper-side gate line GL21, a second lower-side gate line GL22, an 11-th pixel P11, a 12-th pixel P12, a 21-st pixel P21, a 22-nd pixel P22 and a plurality of data connection lines CL.

During an N-th frame, a plurality of data lines DL1, DL2 and DL3 alternately receive the data voltage of the first polarity (+) and the data voltage of the second polarity (−) based on a dot inversion mode. During the N-th frame, the first data line DL1 alternately receives a data voltage of a first polarity (+) and a data voltage of a second polarity (−) by every horizontal period. The first data line DL1 transfers the data voltage of the first and second polarities (+) and (−) to pixels which are included in a pixel column adjacent to a left-side of the first data line DL1 and to pixels included in a first pixel column PC1 adjacent to a right-side of the first data line DL1.

The second data line DL2 alternately receives a data voltage of a first polarity (+) and a data voltage of a second polarity (−), opposite to the first data line DL1 by a horizontal period. The second data line DL2 transfers the data voltage of the first and second polarities (+) and (−) to pixels which are included in a second pixel column PC2 adjacent to a left-side of the second data line DL21 and to pixels included in a third pixel column PC3 adjacent to a right-side of the second data line DL2.

The third data line DL3 alternately receives a data voltage of a first polarity (+) and a second polarity (−), opposite to the second data line DL2 by a horizontal period. The third data line DL3 transfers the data voltage of the first and second polarities (+) and (−) to pixels which are included in a fourth pixel column PC4 adjacent to a left-side of the second data line DL21, and to pixels included in a pixel column adjacent to a right-side of the third data line DL3.

The first upper-side gate line GL11 is disposed at an upper-side portion of the first pixel row PR1, and the first lower-side gate line GL12 is disposed at a lower-side portion of the first pixel row PR1. The first upper-side and lower-side gate lines GL11 and GL12 transfer a gate signal to the pixels in the first pixel row PR1.

The second upper-side gate line GL21 is disposed at an upper-side portion of the second pixel row PR2, and the second lower-side gate line GL22 is disposed at a lower-side portion of the second pixel row PR2. The second upper-side and lower-side gate lines GL21 and GL22 transfer a gate signal to the pixels in the second pixel row PR2.

The 11-th pixel P11 and the 12-th pixel P12 are included in the first pixel row PR1. The 21-st pixel P21 and the 22-nd pixel P22 are included in the second pixel row PR2.

In addition, the 11-th pixel P11 and the 21-st pixel P21 are included in the first pixel column PC1. The 12-th pixel P12 and the 22-nd pixel P22 are included in the second pixel column PC2.

The 11-th pixel P11 includes a transistor, and the transistor is connected to a data connection line, which is connected to the first data line DL1, and the first lower-side gate line GL12.

The 12-th pixel P12 includes a transistor, and the transistor is connected to a data connection line, which is connected to the second data line DL2, and the first upper-side gate line GL11.

The 21-st pixel P21 includes a transistor, and the transistor is connected to a data connection line, which is connected to the first data line DL1, and the second upper-side gate line GL21.

The 22-nd pixel P22 includes a transistor, and the transistor is connected to a data connection line, which is connected to the second data line DL2, and the second lower-side gate line GL22.

According to an exemplary embodiment of the present invention, during the N-th frame, the data lines may alternately receive the data voltages having the first and second polarities (+) and (−) based on the dot inversion mode and thus, the display panel 100E may display an image having the polarity inversion pattern of the (1 by 1)-type. According to an exemplary embodiment of the present invention, the moving line defects may be eliminated by the polarity inversion pattern of the (1 by 1)-type.

Alternatively, a plurality of data lines DL1, DL2 and DL3 alternately receive the data voltage of the first polarity (+) and the data voltage of the second polarity (−) based on a 6-dot inversion mode so that the moving line defects and a data charging defects may be eliminated. During an N-th frame, the first data line DL1 alternately receives a data voltage of a first polarity (+) and a data voltage of a second polarity (−) by every 6 horizontal periods (++++++−−−−−−). The second data line DL2 alternately receives a data voltage of a first polarity (+) and a data voltage of a second polarity (−) opposite to the first data line DL1 by every 6 horizontal periods (−−−−−−++++++. In this case, the display panel 100E may display an image having the polarity inversion pattern of the (2 by 3)-type, and polarities of the red and green pixels R and G reverse with respect to the polarity of the blue pixel B. According to an exemplary embodiment of the present invention, the moving line defects and display defects, caused by a charge difference, may be decreased.

According to an exemplary embodiment of the present invention, upper-side pixels (or lower-side pixels) connected to the upper-side gate line (or lower-side gate line), among the pixels in two adjacent pixel columns, are arranged in the first direction D1 as a zigzag type. The first direction D1 may correspond to a shorter-side of the pixels. The pixel connected to the upper-side and lower-side gate lines are uniformly arranged so that the charge difference by the first and second kickback voltages may be eliminated. Thus, luminance difference by the charge difference may be eliminated.

According to an exemplary embodiment of the present invention, in a pixel structure having a decreased number of data lines, the moving line defects and luminance difference, caused by the kickback voltage, may be eliminated.

The present invention may be applied to any display device, e.g., to an organic light emitting display device, to a liquid crystal display device, etc. For example, the present invention may be applied to a television, to a computer monitor, to a laptop, to a digital camera, to a cellular phone, to a smart phone, to a personal digital assistant (PDA), to a portable multimedia player (PMP), to an MP3 player, to a navigation system, to a video phone, etc.

While the present invention has been particularly shown and described with reference to exemplary embodiments thereof, it will be apparent to those of ordinary skill in the art that various changes in form and detail may be made therein without departing from the spirit and scope of the present invention as defined by the following claims.

What is claimed is:

1. A display apparatus, comprising:

a plurality of pixels arranged in a plurality of pixel rows and a plurality of pixel columns;

a first data line extending in a first direction and configured to transfer a data voltage to pixels in at least two adjacent pixel columns, a first side of a first pixel of a first pixel row extends primarily in the first direction, wherein the first data line is connected to the first pixel of the first pixel row;

a first gate line extending in a second direction crossing the first direction, wherein the first gate line is disposed at a first side of the first pixel row and is connected to the first pixel of the first pixel row, wherein a second side of the first pixel of the first pixel row extends primarily in the second direction, the second side of the first pixel of the first pixel row being longer than the first side of the first pixel of the first pixel row; and a second gate line extending in the second direction, wherein the second gate line is disposed at the first side of the first pixel row adjacent to the first gate line, and the second gate line is connected to a second pixel of the first pixel row.

2. The display apparatus of claim 1, further comprising:

a second pixel row adjacent to the first pixel row, the second pixel row including a third pixel and a fourth pixel;

a third gate line and a fourth gate line extending in the first direction and disposed adjacent to each other, wherein the first and second gate lines, together, and the third and fourth gate lines, together, are disposed on opposite sides of the second pixel row; and a second data line adjacent to the first data line and extending in the first direction, wherein the first and second pixels of the first pixel row and the third and fourth pixels of the second pixel row are disposed between the first and second data lines, wherein the third pixel of the second pixel row is connected to the third gate line, the fourth pixel of the second pixel row is connected to the fourth gate line, and wherein the second pixel of the first row is connected to the first data line, the third pixel of the second row is connected to the second data line, and the fourth pixel of the second row is connected to the second data line.

3. The display apparatus of claim 2, wherein the first and second data lines receive data voltages of different polarities from ach other, and the data voltages charged in the plurality of pixels have a polarity inversion pattern where the data voltages charged in two neighboring pixels, disposed in a same pixel row and between the first and second data lines, have the same polarity.

4. A display apparatus, comprising:

a plurality of pixels arranged in rows and columns;

a first data line extending in a first direction and a second data line adjacent to the first data line, the second data line extending in the first direction and spaced apart from the first data line by at least two columns of pixels, wherein each column of pixels is arranged in the first direction;

first and second pixels disposed in a first row of pixels between the first and second data lines, wherein each row of pixels is arranged in a second direction crossing the first direction, and a first gate line and a second gate line extending in the second direction, wherein the first row of pixels is disposed between the first and second gate lines;

third and fourth pixels disposed in a second row of pixels between the first and second data lines, and a third gate line and a fourth gate line extending in the second direction, wherein the second row of pixels is disposed between the third and fourth gate lines; and fifth and sixth pixels disposed in a third row of pixels between the first and second data lines, and a fifth gate line and a sixth gate line extending in the second direction, wherein the third row of pixels is disposed between the fifth and sixth gate lines, wherein the first pixel is connected to the first data line and the second gate line, the second pixel is connected to the first data line and the first gate line, the third pixel is connected to the second data line and the third gate line, the fourth pixel is connected to the second data line and the fourth gate line, the fifth pixel is connected to the first data line and the sixth gate line, and the sixth pixel is connected to the first data line and the fifth gate line, wherein the first, second and third rows of pixels are consecutively arranged, and wherein the first through sixth gate lines are each connected to a same gate driver.

5. The display apparatus of claim 4, wherein, during a first frame, the first data line receives a data voltage of a first polarity, and the second data line receives a data voltage of a second polarity opposite to the first polarity, and wherein the first and second pixels display a first color, the third and fourth pixels display a second color different from the first color, and the fifth and sixth pixels display a third color different from the first and second colors.

* * * * *